(No Model.) 2 Sheets—Sheet 2.
M. MORONEY, Sr.
ADJUSTABLE ELEVATING AND SELF LOADING WHEELED SCRAPER.
No. 359,027. Patented Mar. 8, 1887.
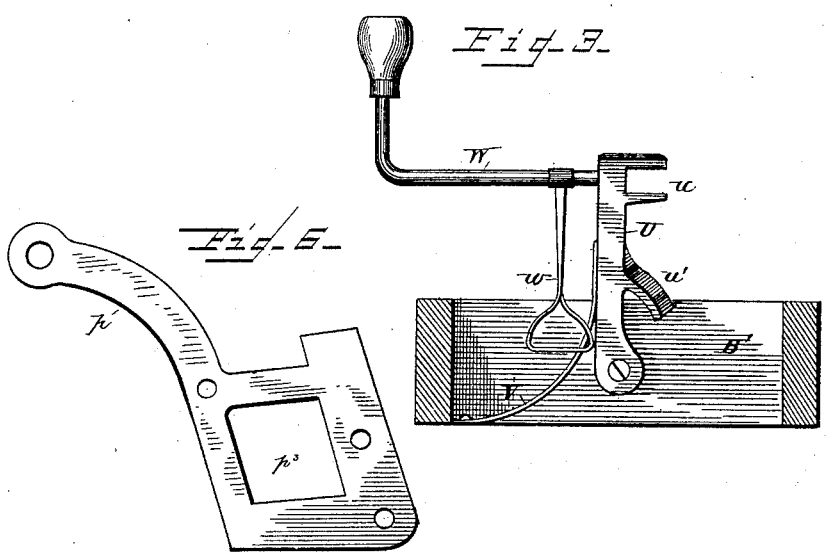
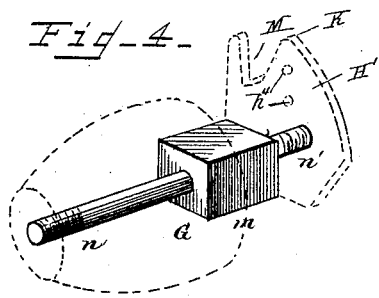
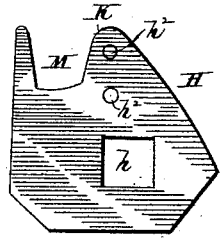
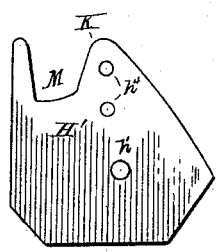
WITNESSES
Wm F Huntemann
Edwin L. Yewell
INVENTOR
M Moroney Sr
By W A Redmond
Attorney

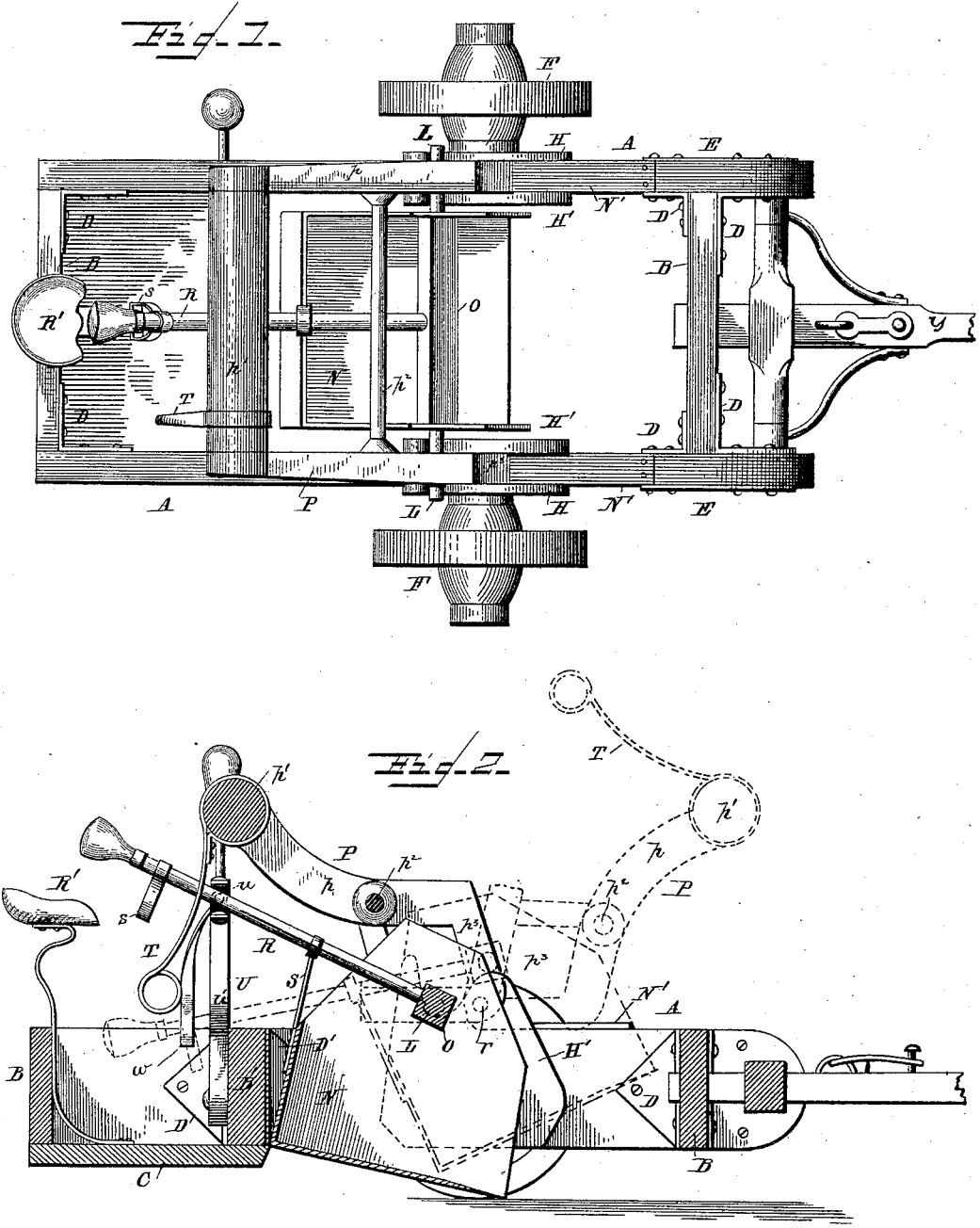

UNITED STATES PATENT OFFICE.

MICHAEL MORONEY, SR., OF CRESTON, IOWA.

ADJUSTABLE ELEVATING AND SELF-LOADING WHEELED SCRAPER.

SPECIFICATION forming part of Letters Patent No. 359,027, dated March 8, 1887.

Application filed November 1, 1886. Serial No. 217,698. (No model.)

*To all whom it may concern:*

Be it known that I, MICHAEL MORONEY, Sr., a citizen of the United States, residing at Creston, in the county of Union and State of Iowa, have invented certain new and useful Improvements in Adjustable Elevating and Self-Loading Wheel-Scrapers; and I do hereby declare the following to be a full, clear, and exact description of the invention, such as will enable others skilled in the art to which it appertains to make and use the same.

This invention relates to wheel-scrapers; and it has for its object to provide a simple, durable, and effective scraper, whereby more work may be done with less labor than can be done by any scraper with which I am familiar; and it consists of the parts and combinations of parts hereinafter described and claimed.

In the accompanying drawings, forming a part of this specification, Figure 1 is a plan view of my improved scraper; Fig. 2, a longitudinal section of the same; Fig. 3, a detail view of the pivoted retaining-bar; Fig. 4, a detail view of one of the axles, the hub and lug H' being shown in dotted lines; Fig. 5, a side view of one of the lugs H; Fig. 6, a side view of one half the elevator, and Fig. 7 a view of one of the lugs H'.

Similar letters refer to similar parts throughout all the views.

A represents the side pieces, and B B' the cross-bars forming the frame of the machine, the front portion of which is bottomless and the rear portion having a flooring, C, so as to form a box or receptacle for tools or other purposes. The side pieces, A, are mortised a short distance from their front ends and at their rear ends, and the cross-bars B B' are tenoned therein. They are further secured by means of the angle-irons D D', bolted at the corners of the frame on the inside, and the brace-plates E bolted on the outside of the frame, so as to make a strong and durable frame for the machine. The angle-iron D' is formed of one piece of metal, which extends across the frame as a protection for the bar B', against which the rear end of the scoop or scraper N comes in contact, and which would soon be worn away if not protected by the iron. The upper edges of the side pieces, A, are also protected by iron strips N' against wear.

The frame is supported by two wheels, F, which are journaled on two short axles, G, located near or at the center of the side pieces, the construction of which will be described. On each side of the side pieces, A, two lugs, H H', (see Figs. 5 and 6,) are secured. The lugs H have square openings $h$ formed in them near their centers, and two perforations, $h^2$, one above the other, immediately over the square opening. These lugs are to be bolted to the side-pieces on the outside of the frame, so that their square openings will correspond with square openings in the frame, and their perforations $h^2$ stand clear of the upper edges of the side pieces. The lugs H' have round screw-threaded openings $h'$ at or near their centers, and perforations $h^4$, corresponding to the perforations $h^2$. The upper edges of lugs H H' are rounded or sloping upward, as at K, and a slot, M, having its sides somewhat inclined, is formed therein.

The axle G is formed with a square portion, $m$, from which project in opposite directions the short arms $n$ $n'$, both of which are round and screw-threaded on their ends. These axles are first inserted in the square openings formed in the side pieces, A, as tightly as possible, so as to have the square portion on the inside flush with the inner surface of the side pieces and the portion on the outside slightly projecting. The lugs H are then passed over the arm $n$, and the openings $h$ fitted over the projecting portion thereof and securely bolted to the side pieces, and the lugs H' are screwed onto the inner arms, $n'$, and then bolted to the side pieces, thus preventing the axles turning with the wheels, the latter being passed over the arms $n$ and secured there by a nut, as is usual.

The scraper or scoop N is made in the ordinary form, and is located between the side pieces, A, and cross-bars B B', it being prevented rubbing against the sides by the lugs H' and against bar B' by the iron D'. A bar, O, extends from side to side of the scraper N, to brace the same and keep it firm, and a transverse shaft, L, is passed through said bar and extends a sufficient distance on each side to pass through openings in the elevator P and rest when the scraper is in position to be filled in the slots M. The elevator P consists of the curved arms $p$, firmly connected by bars $p' p^2$, having the diamond-shaped ends $p^3$, which are cast open, as shown, for the sake of lightness. In the forward points of the ends $p^3$ a hole is drilled for the reception of a pin, $r$, which passes through the perforations $h^2 h^4$ in the lugs H H', thus pivotally securing the elevator between the lugs, where it may be adjusted higher or lower to suit its work by merely passing the pin $r$ through the upper or lower perforations. Thus it will be seen that the scraper or scoop N is journaled in the elevator eccentrically to the pivot of the latter, and that the movement back or forth of the elevator will raise or lower the scoop or scraper, the ends of the latter resting firmly on the iron-shod edges of the side pieces, A, so as to support the scoop in whichever position it may be placed. At about the center of the bar O one end of a lever, R, is rigidly attached, its other end terminating in a handle, which reaches to within a handy distance of the driver when on the seat R'. This lever is also attached to a rod, S, rigidly attached to the rear end of the scraper N, so that the raising or lowering of the lever will turn the scoop on its shaft L and raise or lower the front or rear of the same. A stirrup, $s$, is also attached to the lever, so that it may be operated by the foot of the driver. A rod, T, is secured to the bar $p'$, whereby the driver may throw the elevator back or forth. U is an upright bar pivoted at its lower end to the bar B' and having two hooks or detents, $u$ $u'$, formed thereon, the lower one, $u'$, being curved downwardly.

To the floor C of the frame a flat spring, V, is secured, its upper end resting against the bar U on the side opposite the hooks, so as to press the same away from it.

W is a lever, one end of which is attached to the upright U, and projects at right angle thereto. To this lever a stirrup $w$, is attached, whereby it may be operated by the foot of the driver.

A pole, Y, is rigidly attached to the front end of the machine, making a stiff or standing tongue.

As shown in Fig. 2 in full lines, the scraper is in position for filling or loading, while the dotted lines in the same figure show it as having been filled and ready to be dumped. To put it in position for filling, it is only necessary to draw the elevator backward toward the driver and throw the upright U back against the spring and place the lever R in the hook $u$. This will bring the parts in the position shown in full lines in Fig. 2. When it is loaded, throw the elevator forward, unhook lever R from hook $u$, and place it in hook $u'$, when the parts will assume the position shown in dotted lines. One man can do this conveniently and also manage a team of horses at the same time without leaving his seat on the machine.

Having thus described my invention, what I claim as new, and desire to secure by Letters Patent, is—

1. The combination, in a wheel-scraper, of the lugs H H', having the curved slots M and perforations $h^2 h^4$, the scoop or scraper N, bar O, shaft L, and elevator P, substantially as described.

2. The combination, in a wheel-scraper, of the side pieces, A, the bars B B', the angle-irons D D', the lugs H H', having slots M and perforations $h^2 h^4$, and the former having the square opening $h$ and the latter the screw-threaded openings $h'$, the axle, the wheels, the elevator journaled or mounted on said lugs, the scraper N, mounted or journaled in said elevator, and the rearwardly-extending lever R, whereby said scraper may be thrown into or out of operative position, as described.

3. The combination, in a wheel-scraper, of the elevator P, consisting of the curved arms $p$, terminating in the diamond-shaped ends $p^3$, and the bars $p'$ $p^2$, with the scraper N, journaled in the end of said elevator, the bar O, the lever R, rigidly attached to said bar, the rod S, the pivoted upright U, having hooks $u$ $u'$, and spring V, whereby the scraper may be thrown into or out of operative position, and thus retained by the driver without leaving his seat, as set forth.

4. A frame for wheel-scrapers, consisting of the side pieces, A, the cross-bars B B', the angle-irons D D', the brace-plates E, and flooring C, substantially as described.

5. The combination, in a wheel-scraper, of the side pieces, A, the wheels F, the lugs H, having square opening $h$, the lugs H', having screw-threaded perforations $h'$, the axles G, having the square portion $m$, and screw-threaded arms $n n'$, substantially as described.

6. The hereinbefore-described scraper, consisting of the side pieces, A, cross-bars B B', angle-irons D D', brace-plates E, lugs H H', stiff or standing tongue Y, pivoted upright U, having hooks $u$ $u'$, spring V, lever W, scraper N, lever R, rod $s$, axles L, elevator P, having diamond-shaped ends $p^3$, rod T, and bar $p'$, substantially as set forth.

7. The combination, in a wheel-scraper, of the elevator P, having the diamond-shaped ends $p^3$, the lugs H H', the pin $r$, and a scoop or scraper eccentrically journaled in said elevator, substantially as described.

In testimony whereof I affix my signature in presence of two witnesses.

MICHAEL MORONEY, Sr.

Witnesses:
JAMES GRIFFIN,
THOS. McGRATH.